United States Patent [19]
MacDonald

[11] Patent Number: 6,005,993
[45] Date of Patent: Dec. 21, 1999

[54] DEFLECTION OPTICAL MATRIX SWITCH

[76] Inventor: Robert I. MacDonald, 6452 Clingin Lane, Manotick, Ontario, Canada

[21] Appl. No.: 09/084,114

[22] Filed: May 26, 1998

[30] Foreign Application Priority Data

Nov. 14, 1997 [CA] Canada .................................. 2221200

[51] Int. Cl.$^6$ ..................................................... G02B 6/26
[52] U.S. Cl. .................................. 385/16; 385/20; 385/24
[58] Field of Search .......................................... 385/16–24

[56] References Cited

U.S. PATENT DOCUMENTS

| | | | |
|---|---|---|---|
| 5,221,987 | 6/1993 | Laughlin | 359/222 |
| 5,444,801 | 8/1995 | Laughlin | 385/16 |
| 5,553,175 | 9/1996 | Laughlin | 385/16 |
| 5,555,327 | 9/1996 | Laughlin | 385/16 |
| 5,555,558 | 9/1996 | Laughlin | 385/16 |
| 5,566,260 | 10/1996 | Laughlin | 385/16 |
| 5,647,033 | 7/1997 | Laughlin | 385/16 |

*Primary Examiner*—Phan T. H. Palmer
*Attorney, Agent, or Firm*—Neil Teitelbaum & Associates

[57] ABSTRACT

This invention relates to a method and apparatus for switching an optical signal from one or more input ports to one of a plurality of output ports. A beam is launched into the input port. By controllably switching a switching element, such a liquid/air switch selection can be made selecting a plurality of deflections along a first plane to direct a beam along the first plane to one of a plurality of output locations; the beam is received from one of the plurality of locations and is directed along a second plane intersecting the first plane, to direct the beam to one of the output ports. In a preferred embodiment, the switch includes two prisms each having switching elements at end faces of the prisms.

24 Claims, 8 Drawing Sheets

DEFLECTION OPTICAL MATRIX SWITCH

FIELD OF THE INVENTION

The present invention relates to an n×m optical switch for use in an optical system such as a switching network, n being ≧1, m>1.

BACKGROUND OF THE INVENTION

Optical matrix switches, for example, n×m optical switches, are capable of connecting one or more input fibers to any one of a number of optical output fibers by reflecting a signal on a selected one of an array of reflective means. Usually an array of parallel input optical fibers are arranged orthogonal to an array of parallel output optical fibers; however these switches are usually bi-directional such that all ports can function as input/output ports. Movable or state changing reflective means are arranged at each of the intersections between the optical paths launched from input and output fibers for selectively coupling a signal from an input fiber to a desired output fiber. Switches of this type are constructed using a wide variety of structures, including mechanical, opto-electronic and magnetic actuation. An n×n optical matrix switch of this type requires $n^2$ reflective means to allow n input ports to be connected to n output ports in a non-blocking fashion.

U.S. Pat. No. 4,988,157 to Jackel et al. herein incorporated by reference, discloses an n×m optical matrix switch having slots at 45 degrees to orthogonal waveguides. The slots are filled with a liquid that matches the refractive index of the waveguides. Electrodes positioned adjacent to the slots form gas bubbles in a selected slot by electrolysis. One of the electrodes catalyses the reformation of the liquid from the bubble components when a voltage pulse is applied. Light in the input waveguides is transmitted through an intersection in the presence of liquid, but is reflected into an output waveguide in the presence of bubbles.

Another n×m optical matrix switch is disclosed in U.S. Pat. No. 4,580,873 to Levinson. This m×n optical switch is formed on a semiconductor substrate. Grooves are etched at the edges of the substrate to accommodate input and output optical fibers so that the output fibers are placed orthogonal to the light paths of the input fibers. At each cross point defined by the input and output fibers, an electromechanically actuated mirror is provided which in one position permits passage of light from its associated input fiber to a subsequent mirror, and in another position deflects the light to its associated output fiber.

Another example of a matrix switch is disclosed in U.S. Pat. No. 5,255,332 to Welch et al. The reflective means in this m×n optical switch matrix comprises an array of gratings formed in a semiconductor heterostructure. The gratings have two states. When a refractive index change is induced, the Bragg condition for the light received from an optical signal is met, and a portion of the light is diffracted from the row in which it is propagating into a column toward another optical fiber. In the off state, if the incident light does not satisfy the Bragg condition, the beam propagates unperturbed through the grating to be sampled by a subsequent switch.

Switches vary in size from the minimum 1×2 to very large matrixes exceeding 100×100.

Today, currently available switching matrices are being manufactured by use of a single stage architecture where both input and output sides of a P×P matrix are comprised of 1×P rotary switches. A rotary switch of this type is described by Duck et al. in U.S. Pat. No. 4,378,144. Duck et al. propose an arrangement wherein a faceplate comprising a number of collimating lenses along a pitch circle is attached directly to a stepping motor, the shaft of the motor being coaxial with the pitch circle. A rotatable arm with a collimating lens is attached to the shaft for rotation along the pitch circle, with a small distance therebetween, so that the lens of the arm can be optically connected with the lenses on the faceplate when the rotatable arm is moved by means of the shaft of the stepping motor. An optical input fibre is connected to the collimating lens (hereafter called a lens-to-fibre unit) of the arm and a plurality of optical output fibres are attached to the respective collimating lenses on the faceplate for a switching operation when the rotatable arm moves from one position to another.

Configuring a plurality of 1×P rotary switches into a single stage P×P switch has the following limitations:

a) the cost of the switch is largely dependent upon the cost of the number lens-to-fibre units required; and, b) The maximum reconfiguration time of the component 1×P rotary switch is directly dependent upon the dimension of the matrix.

It is usually preferable that optical switches be efficient, fast and compact. As telecommunication networks have evolved over the years and have become more complex, a need has arisen for a matrix switching system capable of optically coupling any one of a large number of other fibers to another. Furthermore, it is desirable for the switching system to be "non-blocking", i.e. the switching of one input fiber to an output fiber should not interfere with the light transmission of any other input fiber to any other output fiber.

Another type of 1×n optical switch has been disclosed by Laughlin in U.S. Pat. Nos. 5,555,327 5,444,801 5,333,175, 5,555,558 and 5,566,260 wherein one input is switched to any of a plurality of output locations or ports by placing a wedged shaped block of glass next to a prism. Although Laughlin's switch may be useful, it appears to have several drawbacks. For instance, the output beams that exit Laughlin's prism are non-parallel and non-orthogonal to the prism face that they exit. It is believed that the coupling of the light exiting at different angles is somewhat difficult. Furthermore, if Laughlin's wedge is moved slightly out of position so that a beam incident upon the wedge goes through a thicker or thinner portion than expected, the beam will not exit exactly where the light is being collected.

This invention obviates many of the potential problems associated with Laughlin's disclosed invention.

It is an object of this invention to provide an n×n optical switch, that for numbers of n exceeding for example 4, would require less than $n^2$ optical switching elements.

It is also an object of this invention, to provide an optical switch that wherein a standard gate can be used for each switching element, and wherein the switch requires less than $n^2$ optical switching elements to configure an n×n switch for n>8.

SUMMARY OF THE INVENTION

In accordance with the invention there is provided, an optical switch comprising:

a first deflector having a first port for launching at least a beam of light, said deflector having a plurality of light receiving locations;

switching means for switching a beam of light launched into the first port for selectively directing said beam along one of a plurality of selectable paths defining a first plane to one of the plurality of light receiving locations; and, a second deflector having output locations, the second deflector being optically coupled with the first deflector, the second deflector for directing light from one of the light receiving locations to one of the output locations along at least a path defining a second plane, the first plane and the second plane intersecting one another.

In accordance with the invention there is provided, an optical switch comprising:

a first deflector having a plurality of input ports for launching input beams of light, said deflector having a plurality of light receiving locations;

switching means for switching beams of light launched into any of the input ports and for selectively directing each of said beams along one of a plurality of selectable paths to one of the plurality of light receiving locations, each plurality of selectable paths defining a plane, said planes defined by said beams being parallel first planes; and, a second deflector having output locations, the second deflector being optically coupled with the first deflector, the second deflector for directing light from any one of the light receiving locations to one of the output locations along at least a path defining a second plane intersecting the parallel first planes.

In accordance with the invention there is provided, an optical deflection switch comprising:

a first light transmissive prism, having a plurality of input ports and having a plurality of sequential deflection regions coupled thereto disposed to receive light launched into any of the plurality of input ports, each deflection region having at least two selectable deflective surfaces disposed, upon selection to reflect the light to a next sequential deflection region so that a beam launched in at least one of the input ports follows one of a plurality of selectable paths to one of a plurality of output locations;

means for selectively changing the optical path length between deflections of the optical path within sequential deflection regions;

a second light transmissive prism coupled to the first prism for substantially changing the direction of beams at the output locations and for directing said beams to output ports.

In accordance with the invention, there is provided, an optical deflection switch for selectably switching any of n input signals to at least m output locations, comprising:

a first module including:

a first deflector having a plurality of deflecting surfaces for reflecting a plurality of optical signals by total internal reflection;

n input ports about a face of the deflector, wherein n>1, a plurality of sequential deflection means disposed to receive light that has been launched into at least some of the n input ports and that has passed through at least some of the plurality of deflecting surfaces, each of said plurality of sequential deflection means being operable to reflect said light to one of a next deflection means, deflecting surface and an output location.

In accordance with the invention, there is further provided, an optical switch comprising:

a prism having n input ports and having a first plurality light reflective regions and a second plurality of light reflective regions, each light reflective region in said first plurality being disposed to receive light from one of the n input ports and to reflect the light to one of the reflective regions in the second plurality of light reflective regions in a first mode of operation;

in a second mode of operation, light reflecting means in the first plurality being light transmissive for allowing light to propagate therethrough; and, a plurality of deflection means disposed adjacent the light reflective regions operable to reflect light that has propagated through any of the first and second plurality of light reflective regions, any of said n input ports being switchable to any of n output ports by controlling the reflection of light launched into the input ports through selection of the first mode or the second mode of operation.

In accordance with the invention, there is further provided, an optical deflection switch comprising:

a light transmissive material, having a plurality of input ports and having a plurality of sequential deflection regions disposed to receive light launched into any of the plurality input ports, each deflection region having at least two selectable deflective surfaces disposed, upon selection to reflect the light to a next sequential deflection region so that a beam launched in at least one of the input ports follows one of a plurality of selectable paths to one of a plurality of output ports; and means for selectively changing the optical path length between deflections of the optical path within sequential deflection regions.

In accordance with the invention, there is provided, an optical deflection switch comprising:

a light transmissive material, having a plurality of input ports and having a plurality of sequential deflection regions coupled thereto disposed to receive light launched into any of the plurality input ports, each deflection region having at least two selectable deflective surfaces disposed, upon selection to reflect the light to a next sequential deflection region so that a beam launched in at least one of the input ports follows one of a plurality of selectable paths to one of a plurality of output ports; and means for selectively changing the optical path length between deflections of the optical path within sequential deflection regions.

In accordance with the invention there is further provided, an optical deflection switch comprising:

a light transmissive material, having a plurality of input ports and having a plurality of sequential deflection regions coupled thereto disposed to receive light launched into any of the plurality input ports, each deflection region having at least two selectable deflective surfaces disposed, upon selection to reflect the light to a next sequential deflection region so that a beam launched in at least one of the input ports follows one of a plurality of selectable paths to one of a plurality of output ports; and means for selectively changing the optical path length between deflections of the optical path within sequential deflection regions.

In accordance with a different aspect of the invention, a method is provided of switching an optical signal from an input port to one of a plurality of output ports, comprising the step of:

launching a beam of light into the input port;

selecting a plurality of deflections along a first plane to direct the beam along the first plane to one of a plurality of output locations;

receiving the beam from one of the plurality of locations and directing the beam along a second plane intersecting the first plane, to direct the beam to one of the output ports.

BRIEF DESCRIPTION OF THE DRAWINGS

Exemplary embodiments of the invention will now be described in conjunction with the drawings in which.

DETAILED DESCRIPTION

Figure 1:
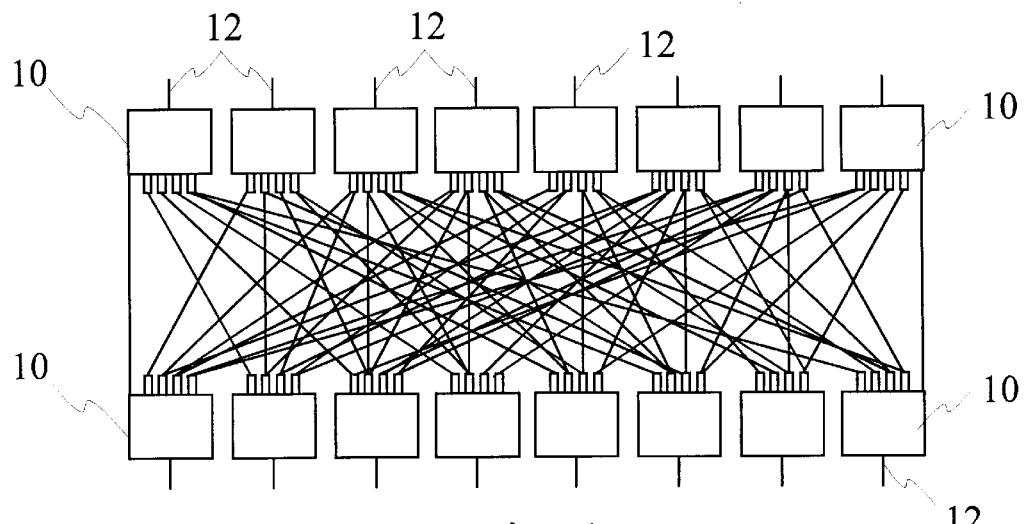
FIG. 1 is a schematic block diagram of a prior art conventional 8×8 non-blocking optical switch formed from 16 1×8 optical switch blocks.

Referring now to FIG. 1, a single stage switched distribution, switched recombination (SDSR) design is shown wherein each port 12 is connected to a 1×P rotary fibre switch, as is described by Duck et al. mentioned above, where P is the overall dimension of the matrix. As is illustrated, optical fibres couple each switch on one side of the matrix to each switch on the other side of the matrix. There are 2P switches including a total of 2P(P+1) lensed fibre units. Therefore the single stage 8×8 matrix shown in FIG. 1 includes a total of 16 1×8 rotary switches 10 including 144 lensed fibre units.

Figure 2:
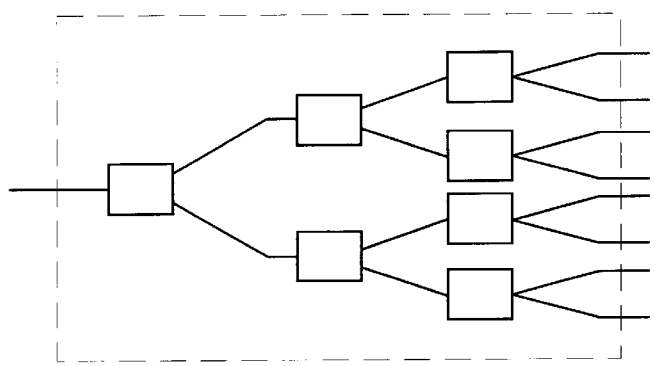
FIG. 2 is a detailed schematic block diagram of a prior art single 1×8 block formed from 1×2 optical switches.

Alternatively, each of the 1×8 switches can be formed of 7 1×2 optical switches configured as shown in FIG. 2. Thus to achieve the architecture shown in FIG. 1, 2n(n−1)=112 1×2 optical switches would be required.

Figure 3:
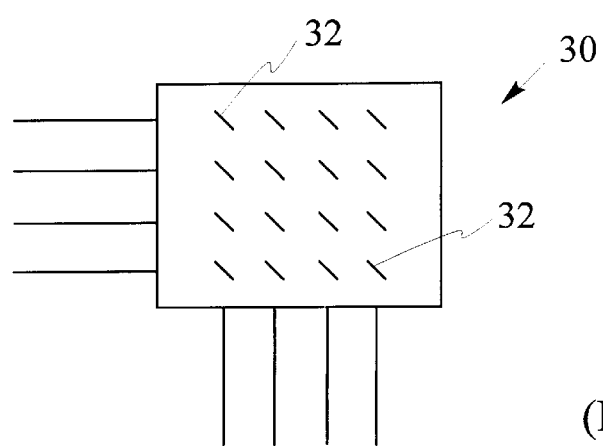
FIG. 3 is a schematic block diagram of a prior art 4×4 optical matrix switch having 16 movable reflective elements.

Turning now to FIG. 3 a 4×4 optical matrix switch 30 is shown having 16 movable reflective elements 32. It should be noted that an 8×8 optical switch of a similar architecture requires 64 reflective elements 32.

Figure 3A:
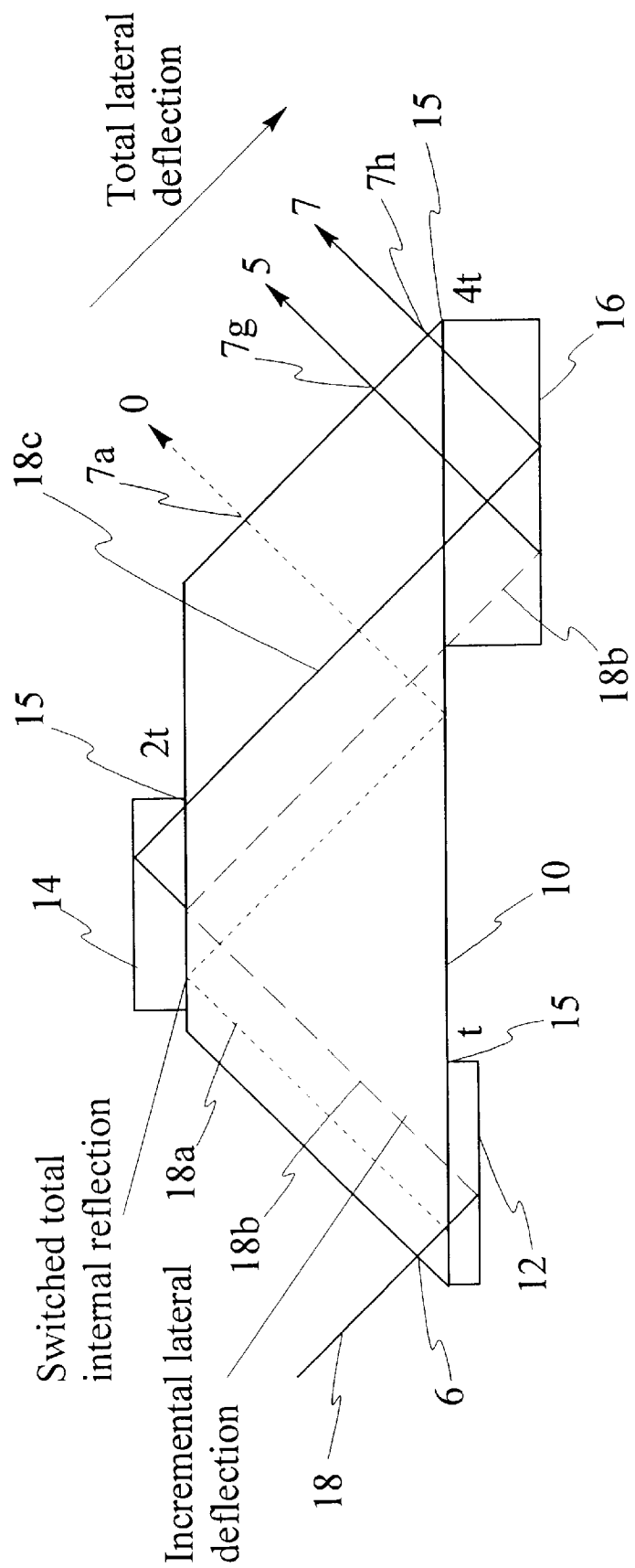
FIG. 3a is an illustrative diagram of a binary optical deflection switch having a single input port and eight output ports.

Referring now to FIG. 3a, a binary optical deflection switch is shown comprised of a trapezoidal shaped block 10 having an input port 6 and having output ports 7a to 7h, wherein ports 7a, 7g, and 7h are shown. The block 10 is made of light transmissive material such as glass. Light transmissive glass blocks 12, 14 and 16 having three different thicknesses t, 2t, and 4t and having the same refractive index as the trapezoidal shaped block 10 are shown to be adjacent the block 10, and spaced from the block 10 by a thin layer of silicone 15 having a refractive index that is substantially the same as the glass blocks or an equivalent resilient index matching buffer material.

Figure 3B:
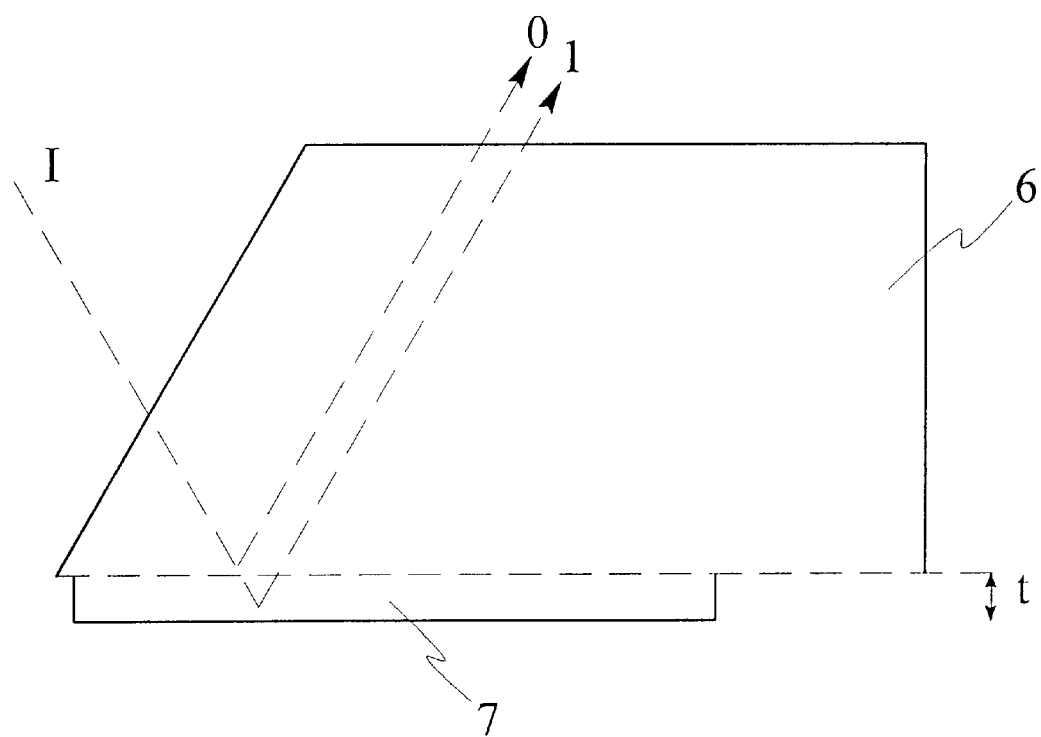
FIG. 3b is an illustrative diagram of a binary optical deflection switch having a single input port and two output ports in accordance with the invention.

A more basic 1×2 optical switch is shown in FIG. 3b having a single input port and two output ports. An input beam is launched from the left of the figure into a block of glass 6. When the glass block 7 (and its buffer material not shown) is optically contacting the block 6, light is routed to port 1. When the glass block 7 is moved so that it does not contact the block 6, light is routed to port 0. The thickness t of the block 7 will determine the spacing between ports 0 and 1. It is noted that the alternate optical paths to the ports 0 and 1 are parallel paths. By using the light transmissive blocks 12, 14, and 16 as shown, and having parallel alternate paths between sequential reflective regions, the 8 output ports 0, . . . 5, 7 shown in FIG. 3a are evenly spaced. This becomes even more important in the n×n optical switch described hereafter.

The operation of the switch can now readily be understood with reference to FIG. 3a and 3b. Although not shown, the blocks 12, 14, and 16 are individually controllably movable such that they are in contact with the block 10 (via the elastomer index matching material) or such that they are lifted off of the block 10. By way of example, several, but not all of the possible selectable paths are shown through the lines 18a, 18b, and 18c which lead to ports 0, 5, and 7 respectively. As a beam of light 18 is launched into the input port 6 of the switch at a predetermined angle, it is either reflected off the air/10 interface or the air/12 interface, depending upon whether block 12 is not, or is, in contact (via the elastomer) with block 10. In the first instance when there is contact between the blocks 10 and 12, the beam 18 reflects off the outward face of the block 12 and follows the path shown by dotted line 18b. In the second instance when there is no contact between the blocks 10 and 12, the beam 18 reflects off the face 10 and follows the path defined by line 18a. Depending upon whether blocks 14 and 16 are lifted off or are in contact with the block 10 will determine which path is followed. The positioning of the blocks 12, 14, 16 adjacent sequential reflective surfaces of the block 10 is determined by the initial launch angle. It should be noted that for a switch with n blocks (i.e. here n=3 for blocks 12, 14, and 16), that there are $2^n$ output ports. For example in this instance, where n=3, the following switching combinations are possible.

| 12  | 14  | 16  |
|-----|-----|-----|
| off | off | off |
| off | off | on  |
| off | on  | off |
| off | on  | on  |
| on  | off | off |
| on  | off | on  |
| on  | on  | off |
| on  | on  | on  |

Figure 4:
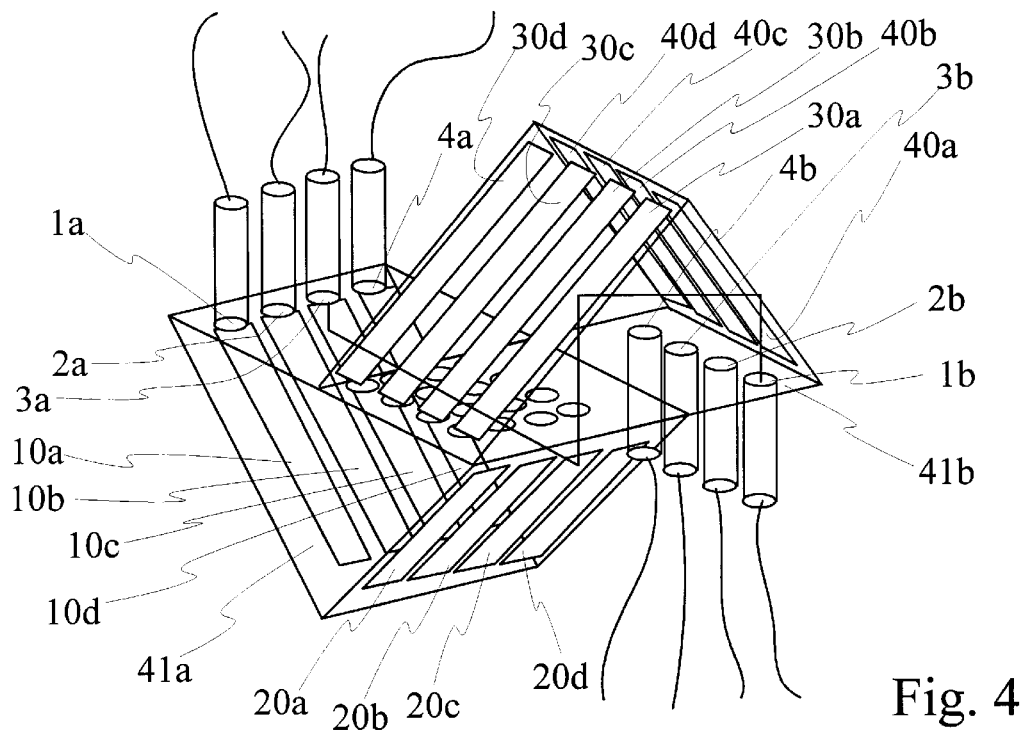
FIG. 4 is a schematic block diagram of a 4×4 optical switch in accordance with an embodiment of this invention.

In another embodiment of the invention, the blocks 12, 14, and 16 can be stationary and can be selectively filled with an index matching fluid or filled with air to allow transmission or reflection upon selection thereof. This switching actuation is described in greater detail in reference to FIGS. 4 to 10. It should be noted that in FIG. 3a selectable optical paths from the block 12 to the block 14 are parallel and selectable optical paths from the block 14 to 16 are also parallel to one another. Conveniently, this parallelism ensures that the output beams will also be parallel to one another making the coupling of the output light considerably easier. Although this embodiment is believed to be an improvement over Laughlin's switch which relies on using a wedge, one disadvantage of this embodiment that is obviated in the switch shown in FIG. 4, is that the blocks 12, 14, and 16 must increase in thickness for the receiving output ports to be evenly spaced. For a 1×64 switch this requires blocks of substantial thickness. In the embodiment of FIG. 4, which is a folded configuration, the difficulty is obviated.

In FIG. 4 a first diffractor 41a in the form of a light transmissive prism is optically coupled with a second diffractor 41b in the form of a second light transmissive prism disposed at right angles to the first diffractor 41a. By positioning the prisms at right angles, the switch can be considerably small allowing an array of input beams to be switched in a first direction to a plurality of intermediate locations, and subsequently in an orthogonal direction to a plurality of output ports, thereby providing a 4×4 non-blocking switch. Four input ports 1a through 4a are disposed along an upper face of the prism 41a. However, it should be noted that if ports 2a through 4a were not provided, a 1×16 optical switch would result.

Figure 5:
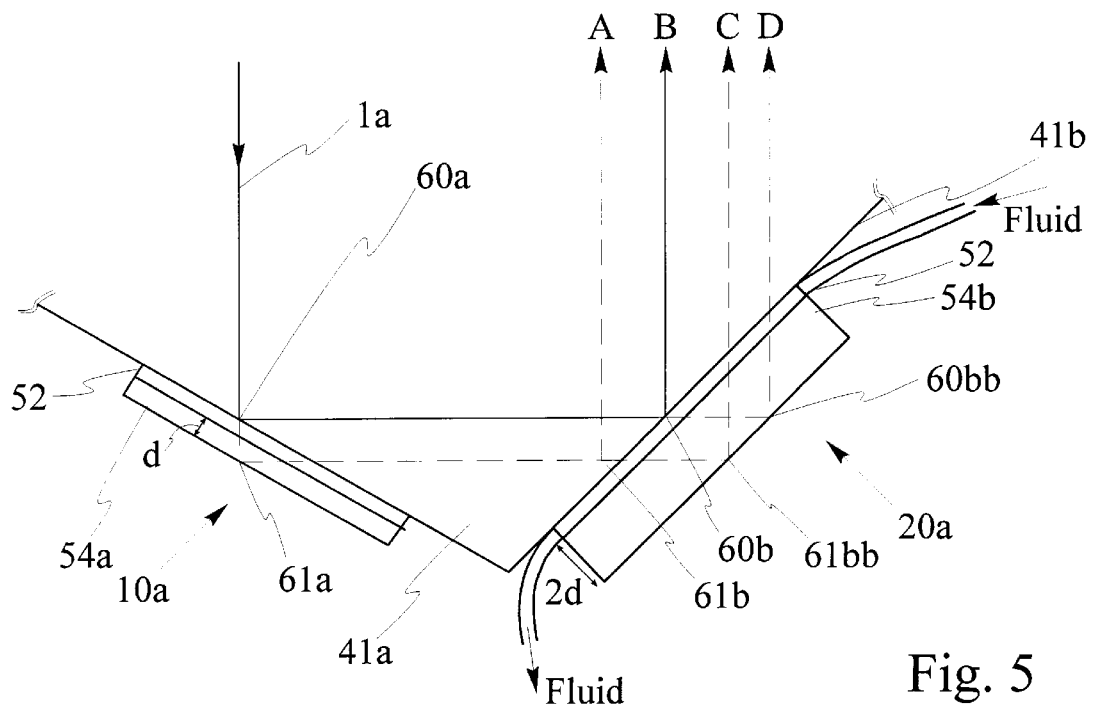
FIG. 5 is a broken away side view of a portion of the switch shown in FIG. 4 wherein the switching element is shown in greater detail.

In FIG. 4, these ports are formed by coupling four input optical fibres to four predetermined locations about the face of the prism 41a using standard optical fibre tube coupling technology. Similarly the output ports 1b through 4b are formed along a lower face of the second diffractor 41b. The presence of controllable two-state optical switching elements are generally shown as longitudinal rectangular regions at 10a, through 10d, 20a through 20d, 30a through 30d, and 40a through 40d and will be described with reference to FIG. 5 in greater detail with reference to switching elements 10a and 20a. Element 10a shown, and elements 10b to 10d not shown, each have a standard switching block 52 sandwiched between an outward face of the prism 41a and a glass block 54a having a thickness of "d" units. The distance "d" is selected in dependence upon the required spacing between the ports on one side of the device. A similar arrangement is shown at the next switching element 20a and each of switching elements 20b to 20d (not shown) wherein a standard switching block is sandwiched between an outside face of the prism 41b and a glass block 54b having a thickness of "2d" units. The second prism 41b also has similar switching elements each having a standard switching block 52. Advantageously, the row of elements 30a to 30d each have a glass block of thickness "d" and the row of elements 40a to 40d each have a glass block of thickness "2d" adjacent a switching block 52, wherein in a linear switch that is not folded by a second prism being orthogonal to the first prism as is the case in this embodiment, the thickness of the glass blocks must increase at each subsequent element. By providing blocks 54a, 54b, 54c, and 54d with different thicknesses a beam launched into the port 1a the beam can be switched to different positions A, B, C, or D as shown in FIG. 5 by controlling the two switches 10a and 20a. Of course any of the input ports can be switched to any of the output ports of this bidirectional switch by switching blocks 52 to achieve this end.

Each standard switching block 52 used for each of the 2nLog$_2$n switches are made of a light transmissive material preferably having a same refractive index as the prism. Each block 52 has therewithin a cavity into which an refractive index matching liquid is pumped in a first transmissive switching mode. In the first switching mode light incident upon the block 52 is transmitted therethrough. Alternatively in a second deflecting switching mode at least some of the index matching fluid is expelled from the cavity so that air is within the cavity and light incident upon the block 52 from the prism is deflected to a next serial block 52.

Figure 5A:
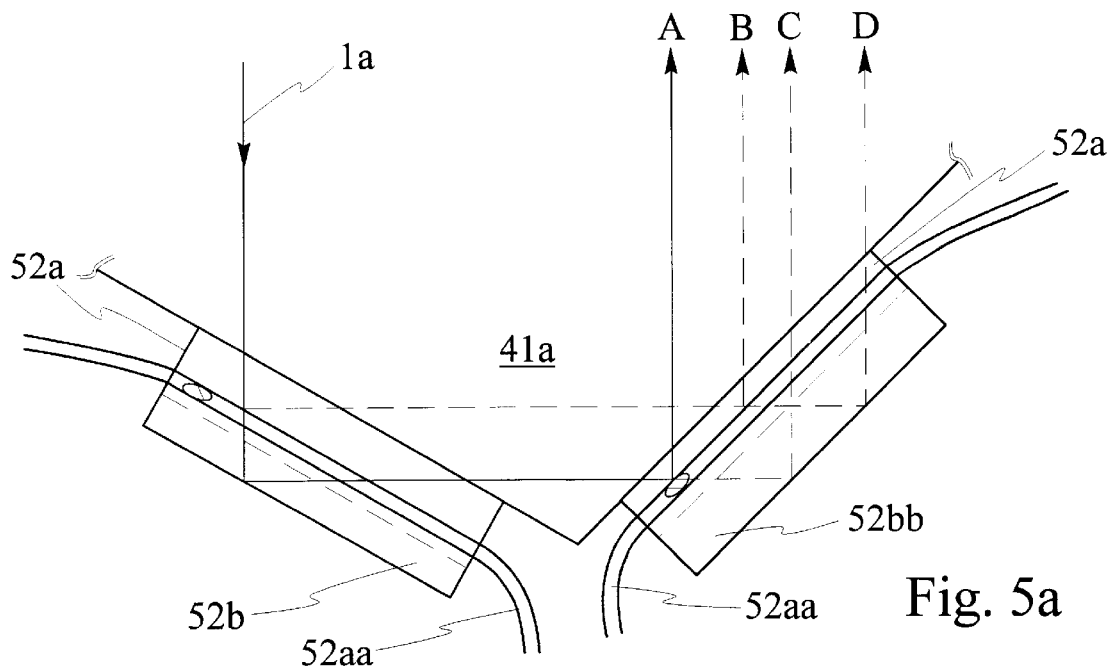
FIG. 5a is a broken away view of a portion of an optical switch having different switching elements than in FIG. 5.
Figure 5B:
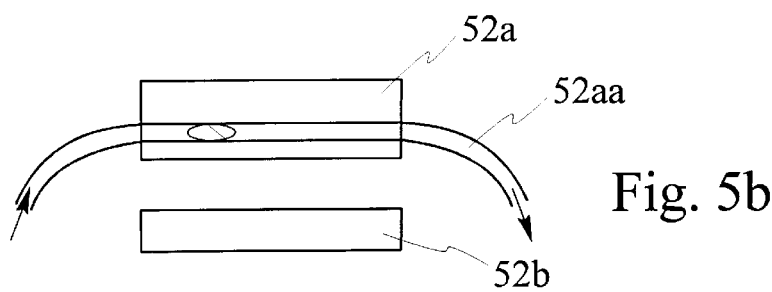
FIG. 5b is a detailed diagram of a switching element shown having its two normally directly coupled components separated.

An alternative embodiment of the switching element is shown in FIG. 5a, wherein a light deflecting region includes a switching element in the form of a glass block 52a having a conduit or longitudinal bore along its length. Another glass block 52b of a first dimension "d" or 52bb of dimension substantially about "2d" is placed directly on top of the block 52a. In this manner a standard block 52a can be used and blocks of appropriate thicknesses can be directly coupled on top. Inlet and outlet conduits in the form of tubes 52aa are used to move index matching fluid and the air bubble shown through the longitudinal bore within 52a as is required. In operation when a beam launched into the switch is incident upon the bubble, the beam is reflected as is shown in the switch block 52a on the right of the figure; alternatively, as is shown on the left, when the beam is incident on the index matching fluid, the beam is transmitted through the longitudinal bore.

Figure 5C:
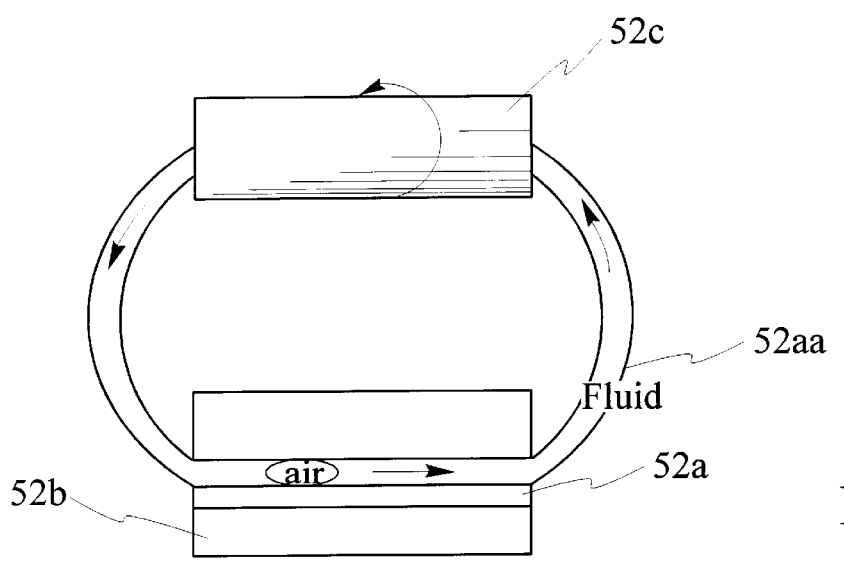
FIG. 5c is a diagram illustrating the mechanism for moving the fluid contained within a tube.

FIG. 5c illustrates the mechanism for moving the fluid contained within the tube 52aa. The exemplary embodiment depicts a solenoid 52c, which can be actuated to move the fluid within the circuit shown, defined by the longitudinal bore and the tube 52aa.

The operation of the optical switch of FIG. 4 can more readily be understood while referring to FIG. 5. However for ease of understanding the operation FIG. 5 is shown to have 1 input/output port and 4 output/input ports instead of the 4 inputs and 4 outputs shown in the 4×4 switch as shown in FIG. 4. The input port in/out 1 can provide its output signal to any one of 4 output locations shown in the row facing the port. Similarly each of the input/output ports in FIG. 4, can provide an output signal to one of 4 output locations depending upon the selection of the switches. It can be seen that the switch is folded to allow any of the beams in the direction from the port in/out1 destined for one of the 4 output ports in the row facing the port in/out1 to be routed orthogonally to one of the output ports.

Figure 6:
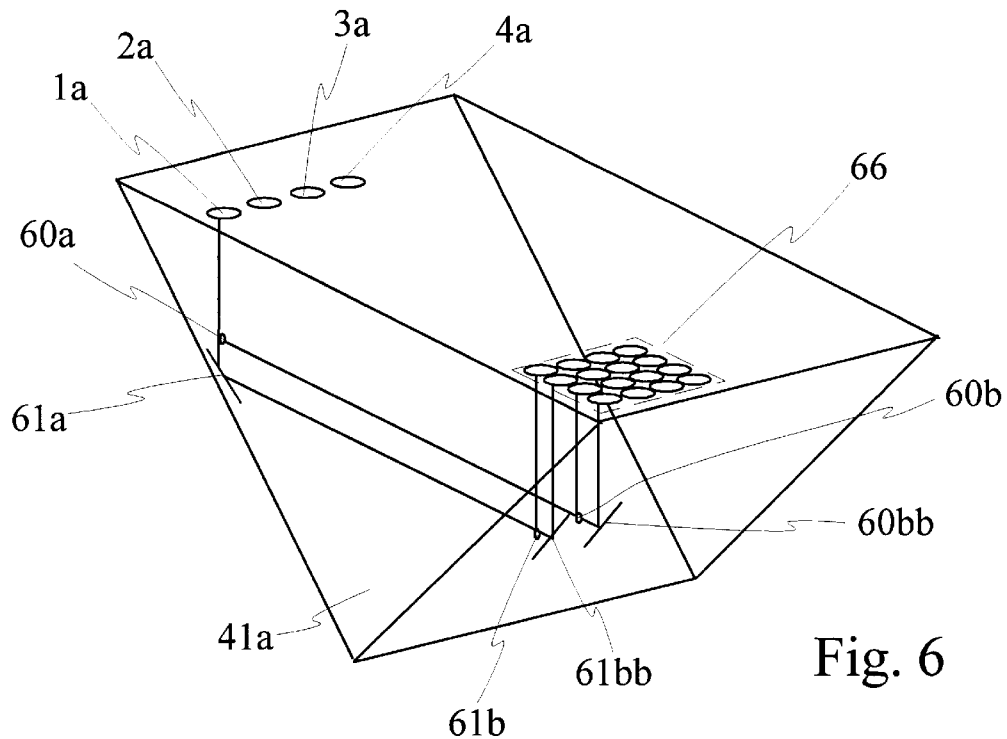
FIG. 6 is a diagram illustrating the light paths through a prism shown in FIG. 4.

FIG. 6 shows in more detail the alternative paths an input beam may be routed along in switching from a first input port to one of four output locations at an upper face of the prism 41a. Depending upon the state of the first switching element 52 (not shown in FIG. 6), an input beam launched into the first port 1a can be reflected at location 60a or to the location 61a. Depending upon the state of the second switching element, one of the two beams reflecting from 60a or 61a can be reflected at locations 61b, 61bb, or 60bb or 60b, thereby providing 1 to 4 switching. Simultaneously, 1 to 4 switching can independently occur for other light beams launched into ports 2a, 3a, and 4a. In this manner 4 input beams can be switched (in a semi-blocking manner) to 16 output locations 66 shown in dotted outline. However the 4 input beams can be switched in a non-blocking manner to 4 output locations.

Referring once again to FIG. 4, the second prism 41b provides a means of directing light launched into all of the input ports to any of the 16 output locations 66 shown in FIG. 6 and to any of the output ports 1b, 2b, 3b, or 4b, in a non-blocking manner. With the exception of the thickness "4d" and "8d" of the glass blocks 54c and 54d respectively, being different than thickness of the blocks 54a and 54b, the prisms 41*a* and 41*b* including switching elements are identical. Of course the ports 1*b* to 4*b* must be accurately optically aligned with the input ports 1*a* to 4*a*.

In operation, light launched any of the ports 1*a* through 4*a* can be switched to any of ports 1*b* through 4*b* by controlling appropriate switching elements 52. Alternatively light launched into any of ports 1*b* through 4*b* can be switched to ports 1*a* through 4*a* through control of the switching elements 52, thereby providing an n×n non-blocking compact bi-directional optical switch having no movable switching elements. Switching is accomplished by the removal or insertion of a fluid into the cavity within a switching element 52.

Figure 7:
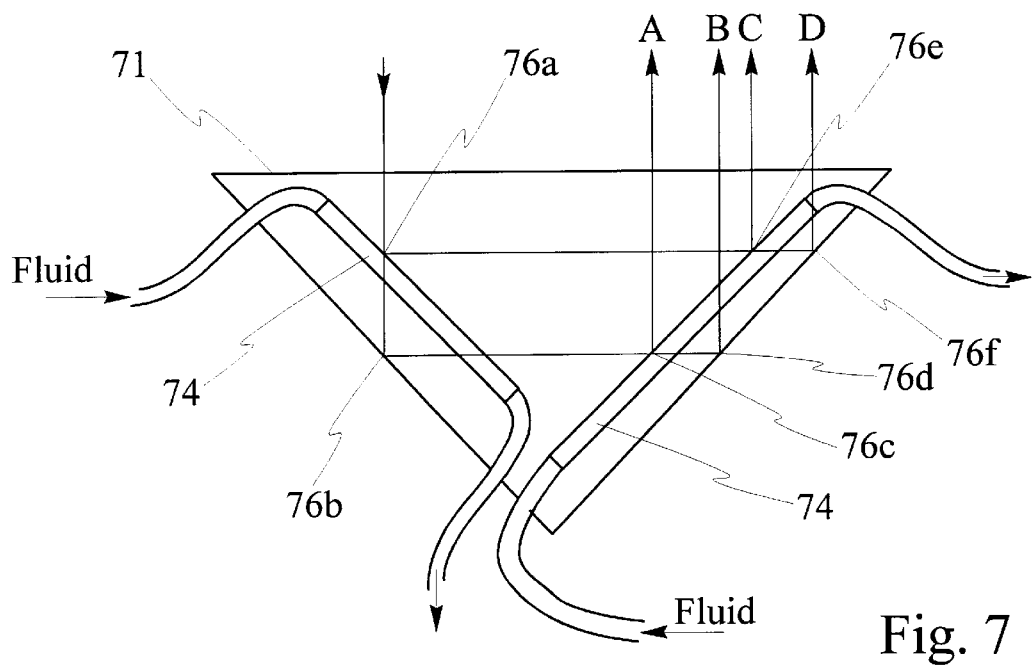
FIG. 7 is a side view of an alternative embodiment of the invention, wherein switching elements are disposed within a glass prism.

In an alternative embodiment shown in FIG. 7, the switching elements can be formed within a prism 71 by boring channels 74 parallel to adjacent sides of the prism 71 that can be filled with a fluid or have fluid evacuated therefrom to switch between transmissive and deflective switching modes of operation. One of the switching elements 74 is shown to be closer to its adjacent side than the other element 74. This variation in distance allows a single input beam to be switched to any of four output positions A, B, C, and D.

Figure 8:
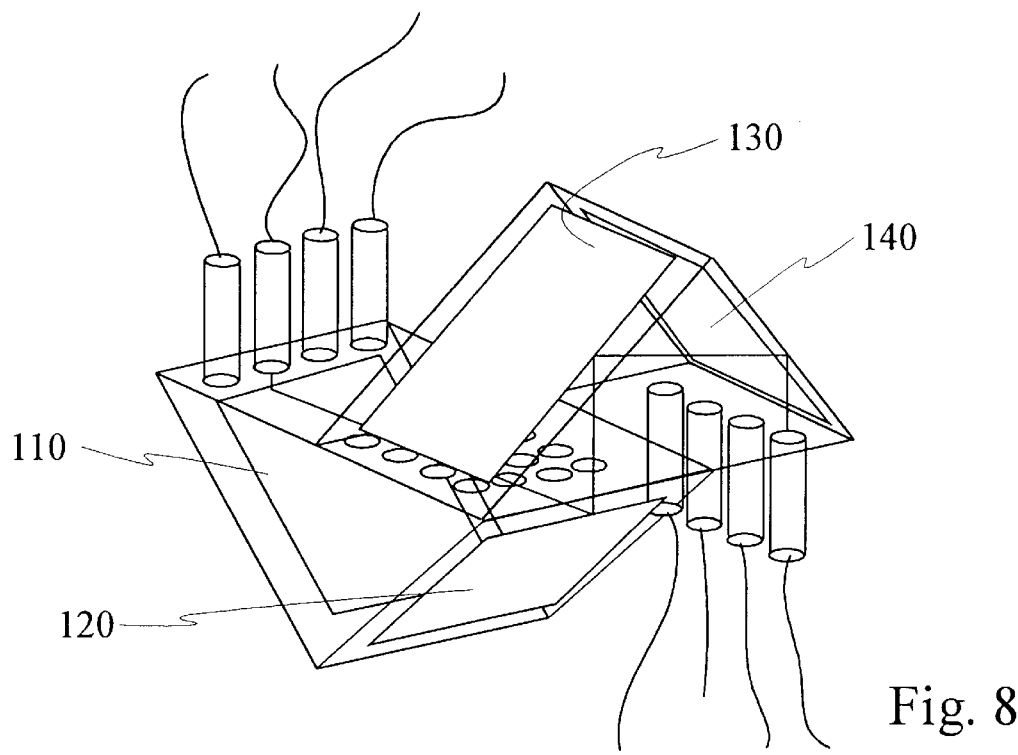
FIG. 8 is diagram illustrating an embodiment of the invention wherein fewer switching elements are provided than in the embodiment of FIG. 4, however the switch is a blocking switch.

Although the embodiments described heretofore in accordance with the invention provide non-blocking switching of optical signals, the embodiment shown in FIG. 8 depicts a blocking version of the 4×4 optical switch. In this embodiment only four switching elements 110, 120, 130, and 140 are required similar to, but wider than elements 10*a*, 20*a*, 30*a* and 40*a* shown in FIG. 5. Each of the elements 110 through 140 requires a switching block sandwiched between a face of the prism and a light transmissive block of a predetermined thickness.

Figure 9:
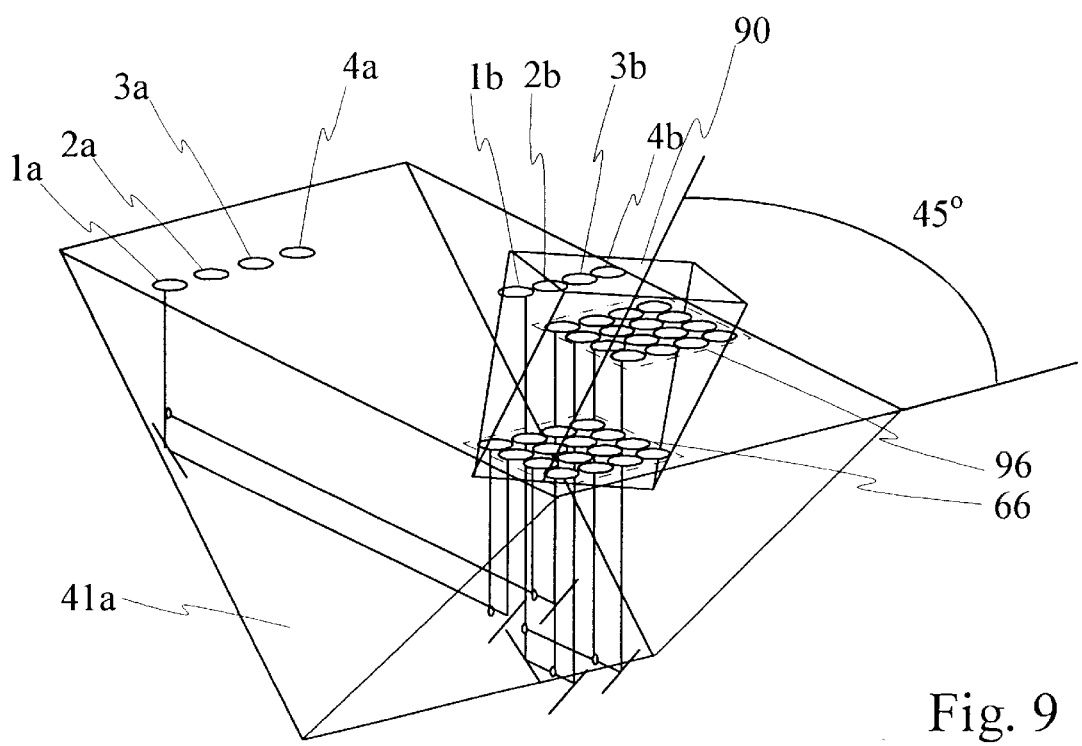
FIG. 9 is a diagram illustrating an alternative embodiment of the invention wherein a prism having switching elements is optically coupled with a prism absent switching elements; and, FIG. 10 shows an embodiment similar to the one shown in FIG. 9, however an additional prism is directly optically coupled with a larger prism.

FIG. 9 shows yet an alternative embodiment of a 4×4 non-blocking optical switch. Here instead of using an identical block 41*b* having switching elements thereon, as is shown in FIG. 4, the same functionality is provided by using a deflector prism 90 angled such that light at the 16 output locations 66 are deflected to 16 output locations 96. Four additional switching elements 10*e* through 10*h* and 20*e* through 20*h* (not shown) are required at two faces of the prism adjacent to the elements 10*a* through 10*d* and 20*a* through 20*d* to direct light from any of the output locations 96 to any of the output ports 90. Thus, by controlling the 16 switching elements any beam launched into any of ports 1*a* through 4*a* can be coupled to any of ports 1*b* through 4*b*.

Figure 10:
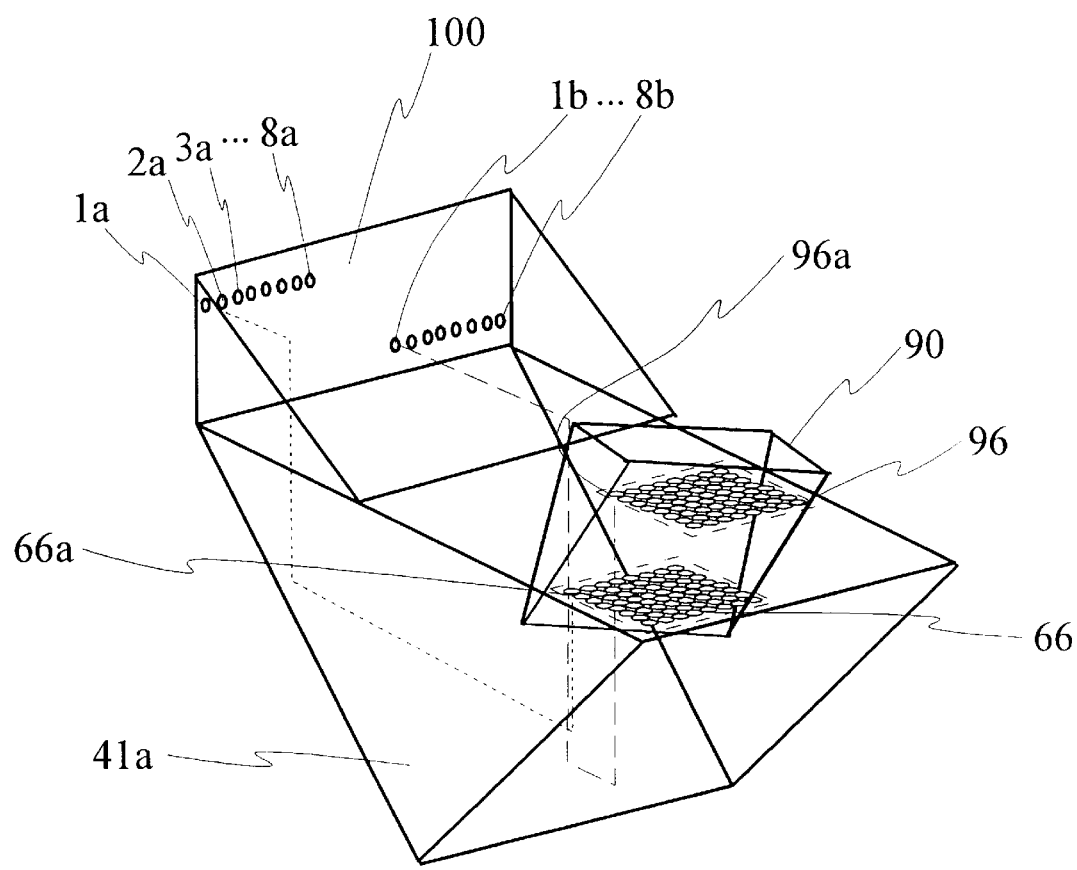

FIG. 10 shows an embodiment similar to the one shown in FIG. 9, however an additional prism 100 is directly optically coupled with the larger prism 41*a*. Input/output ports 1*a* to 8*a* and output/input ports 1*b* to 8*b* are disposed at an end face of the prism 100. The diagram illustrates a path of a beam launched into port 1*a* as it propagates through prisms 100, 41*a* and 90 to reach output/input port 1*b*. The beam launched into port 1*a* is shown as a dotted line and entering the location 66*a* from the below to exit upward to the prism 90. The prism 90 reflects (and maps) the beam to a similar location 96*a* on the array of locations 96. The beam then enters location 96 from above and is then directed to output/input port 1*b* shown by a dashed line.

In all of the embodiments shown, means in the form of a prism 90 shown in FIGS. 9 and 10 or the prism 41*b* as is shown in FIG. 4 provide a means of changing the direction of a plurality of beams launched into an input port directed to a plurality of first selectable locations so as to physically map those locations to a second plurality of selectable locations that are selectably optically alignable with a plurality of output ports.

What is claimed is:

1. An optical switch comprising:
   a first deflector having a first port for launching at least a beam of light, said deflector having a plurality of light receiving locations;
   switching means for switching a beam of light launched into the first port for selectively directing said beam along one of a plurality of selectable paths defining a first plane to one of the plurality of light receiving locations; and,
   a second deflector having output locations, the second deflector being optically coupled with the first deflector, the second deflector for directing light from one of the light receiving locations to one of the output locations along at least a path defining a second plane, the first plane and the second plane intersecting one another.

2. An optical switch as defined in claim 1 including a plurality of sequential deflection regions disposed to receive light launched into the first port, each deflection region having at least two selectable deflective surfaces disposed, upon selection to reflect the light to a next sequential deflection region so that a beam launched into the input port follows one of the plurality of selectable paths to one of the receiving locations, said switching means, for selectively changing the optical path length between deflections of the optical path within sequential deflection regions.

3. An optical switch as defined in claim 2 wherein alternate selectable paths between two sequential deflections regions are parallel.

4. An optical switch as defined in claim 1 wherein the second deflector includes switching means for switching light received at at least one of the light receiving locations to one or more output ports.

5. An optical switch as defined in claim 4, wherein the input port and the output ports are bidirectional such that the input port can serve as an output port and the output ports can serve as input ports.

6. An optical switch as defined in claim 1 wherein the first and second planes are orthogonal.

7. An optical switch as defined in claim 1, wherein the switching means includes a gate having a liquid therein.

8. An optical switch as defined in claim 1, wherein the deflectors are made of a light transmissive material.

9. An optical switch as defined in claim 1, wherein the first parallel planes and second plane are orthogonal.

10. An optical switch comprising:
    a first deflector having a plurality of input ports for launching input beams of light, said deflector having a plurality of light receiving locations;
    switching means for switching beams of light launched into any of the input ports and for selectively directing each of said beams along one of a plurality of selectable paths to one of the plurality of light receiving locations, each plurality of selectable paths defining a plane, said planes defined by said beams being parallel first planes; and,
    a second deflector having output locations, the second deflector being optically coupled with the first deflector, the second deflector for directing light from any one of the light receiving locations to one of the output locations along at least a path defining a second plane intersecting the parallel first planes.

11. An optical switch as defined in claim 10, wherein the second deflector has switching means for selectively switching beams of light from any one of the light receiving locations to one of the output locations.

12. An optical switch as defined in claim 11, wherein the means for switching comprise sequential deflection means.

13. An optical switch as defined in claim 10 including a plurality of sequential deflection regions disposed to receive light launched into the input ports, each deflection region having at least two selectable deflective surfaces disposed upon selection to reflect the light to a next sequential deflection region so that a beam launched in at least one of the input ports follows one of the plurality of selectable paths to one of the receiving locations, said means for switching for selectively changing the optical path length between deflections of the optical path within sequential deflection regions.

14. An optical switch as defined in claim 13 wherein alternate selectable paths between two sequential deflections regions are parallel.

15. An optical switch as defined in claim 10, wherein the second deflector includes switching means for switching light received from at least one of the light receiving locations to one or more output ports.

16. An optical switch as defined in claim 15 wherein the switch is a bidirectional switch and wherein the input ports can serve as output ports and wherein the output ports can serve as input ports.

17. An optical switch as defined in claim 10, wherein the first and second planes are orthogonal.

18. An optical switch as defined in claim 10, wherein the switching means includes a gate having a liquid therein.

19. An optical switch as defined in claim 10, wherein the deflectors are made of a light transmissive material.

20. An optical deflection switch comprising:
    a first light transmissive prism, having a plurality of input ports and having a plurality of sequential deflection regions coupled thereto disposed to receive light launched into any of the plurality input ports, each deflection region having at least two selectable deflective surfaces disposed, upon selection to reflect the light to a next sequential deflection region so that a beam launched in at least one of the input ports follows one of a plurality of selectable paths to one of a plurality of output locations;
    means for selectively changing the optical path length between deflections of the optical path within sequential deflection regions;
    a second light transmissive prism coupled to the first prism for substantially changing the direction of beams at the output locations and for directing said beams to output ports.

21. An optical deflection switch as defined in claim 20, wherein the plurality of sequential deflection regions each comprise a block of material having a cavity defined therein, the cavity containing a refractive index matching fluid.

22. An optical deflection switch as defined in claim 21 wherein the means for selectively changing the path length includes means for moving gas bubbles within the fluid from one portion of the cavity to another.

23. A method of switching an optical signal from an input port to one of a plurality of output ports, comprising the step of:
    launching a beam of light into the input port;
    selecting a plurality of deflections along a first plane to direct the beam along the first plane to one of a plurality of output locations;
    receiving the beam from one of the plurality of locations and directing the beam along a second plane intersecting the first plane, to direct the beam to one of the output ports.

24. A method as defined in claim 23, wherein the beam is directed to the output port by selecting a plurality of deflections along the second plane.

* * * * *